US006446072B1

(12) United States Patent
Schulze et al.

(10) Patent No.: US 6,446,072 B1
(45) Date of Patent: Sep. 3, 2002

(54) METHOD OF OBTAINING AN ELECTRONICALLY-STORED FINANCIAL DOCUMENT

(76) Inventors: Michael D. Schulze, 1607 Kirts, Troy, MI (US) 48084; Richard J. Gagnon, 69 Touraine Rd., Grosse Pointe Farms, MI (US) 48236

( * ) Notice: Subject to any disclaimer, the term of this patent is extended or adjusted under 35 U.S.C. 154(b) by 0 days.

(21) Appl. No.: 09/548,490

(22) Filed: Apr. 13, 2000

Related U.S. Application Data

(60) Provisional application No. 60/129,021, filed on Apr. 13, 1999.

(51) Int. Cl.[7] .............................................. G06F 17/30
(52) U.S. Cl. .............................. 707/10; 707/3; 707/204
(58) Field of Search ................................. 382/137, 245, 382/103; 707/531, 104, 10, 204, 1, 3, 4, 200–201; 385/379

(56) References Cited

U.S. PATENT DOCUMENTS

| | | | |
|---|---|---|---|
| 4,888,812 A | 12/1989 | Dinan et al. ................. 382/140 |
| 4,941,125 A | 7/1990 | Boyne ......................... 707/102 |
| 5,170,466 A | 12/1992 | Rogan et al. ................ 707/530 |
| 5,187,750 A | 2/1993 | Behera ........................ 382/140 |
| 5,287,497 A | 2/1994 | Behera ........................ 707/104 |
| 5,301,350 A | 4/1994 | Rogan et al. .................. 705/33 |
| 5,321,816 A | 6/1994 | Rogan et al. .................. 705/42 |
| 5,783,808 A | * 7/1998 | Josephson et al. ........... 235/379 |
| 5,784,610 A | 7/1998 | Copeland, III et al. ........ 707/10 |
| 5,806,078 A | 9/1998 | Hug et al. ................... 707/511 |
| 5,819,300 A | 10/1998 | Kohno et al. ................ 707/511 |
| 5,897,643 A | 4/1999 | Matsumoto .................. 707/511 |
| 6,029,175 A | * 2/2000 | Chow et al. ................. 707/104 |
| 6,061,686 A | 5/2000 | Gauvin et al. ................. 707/10 |
| 6,065,026 A | * 5/2000 | Cornelia et al. ............. 707/531 |
| 6,097,834 A | * 8/2000 | Krouse et al. ............... 382/137 |
| 6,212,303 B1 | * 4/2001 | Doran et al. ................. 382/245 |
| 6,246,778 B1 | * 6/2001 | Moore ......................... 382/103 |

OTHER PUBLICATIONS

PCT Search Report dated Aug. 22, 2000; International Filing Date Apr. 13, 2000; PCT/US00/009926.

* cited by examiner

*Primary Examiner*—Sam Rimelc
*Assistant Examiner*—J. A. Haythim
(74) *Attorney, Agent, or Firm*—Howard & Howard

(57) ABSTRACT

A method for a bank to obtain an electronically-stored financial document is disclosed. The financial document includes a specific document parameter, such as a record date. The bank maintains the financial document in an off-site storage system when the record date is later than a pre-selected date and in an on-site storage system when the record date is earlier than or equal to the pre-selected date. The off-site storage system is remotely-located from the on-site storage system. The bank receives a request for the financial document from a client and compares the record date to the pre-selected date to determine if the record date is later than, earlier than, or equal to the pre-selected date. In processing the request, the bank utilizes a computer terminal connected to the off-site and on-site storage systems to access one of the storage systems in response to the comparison of the record date to the pre-selected date. After accessing the appropriate storage system, the bank inputs data into the computer terminal to identify the requested financial document and then retrieves the requested financial document. The bank then reproduces the requested financial document and distributes the requested financial document to the requesting client, or some other end user of the bank.

61 Claims, 4 Drawing Sheets

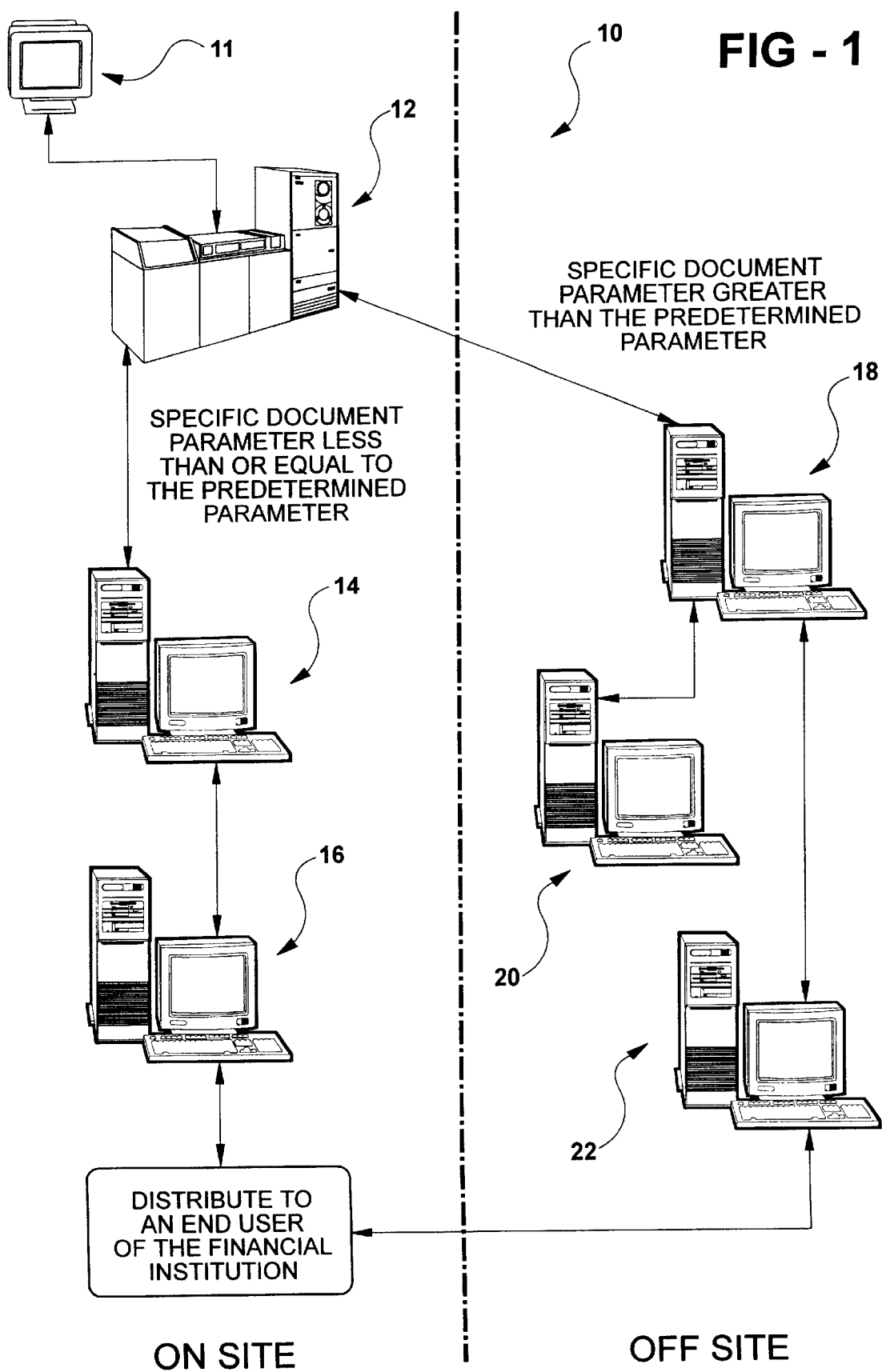

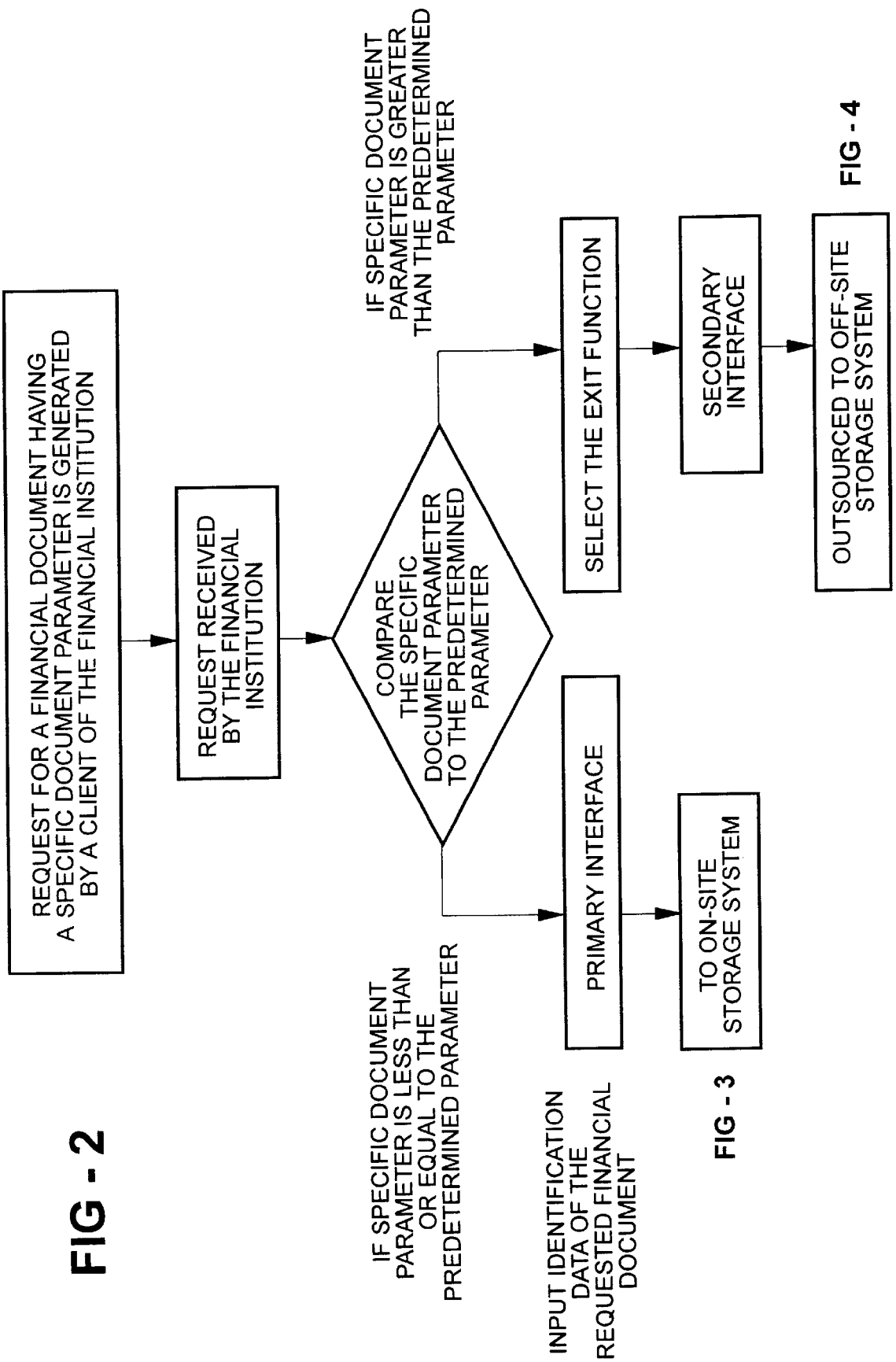

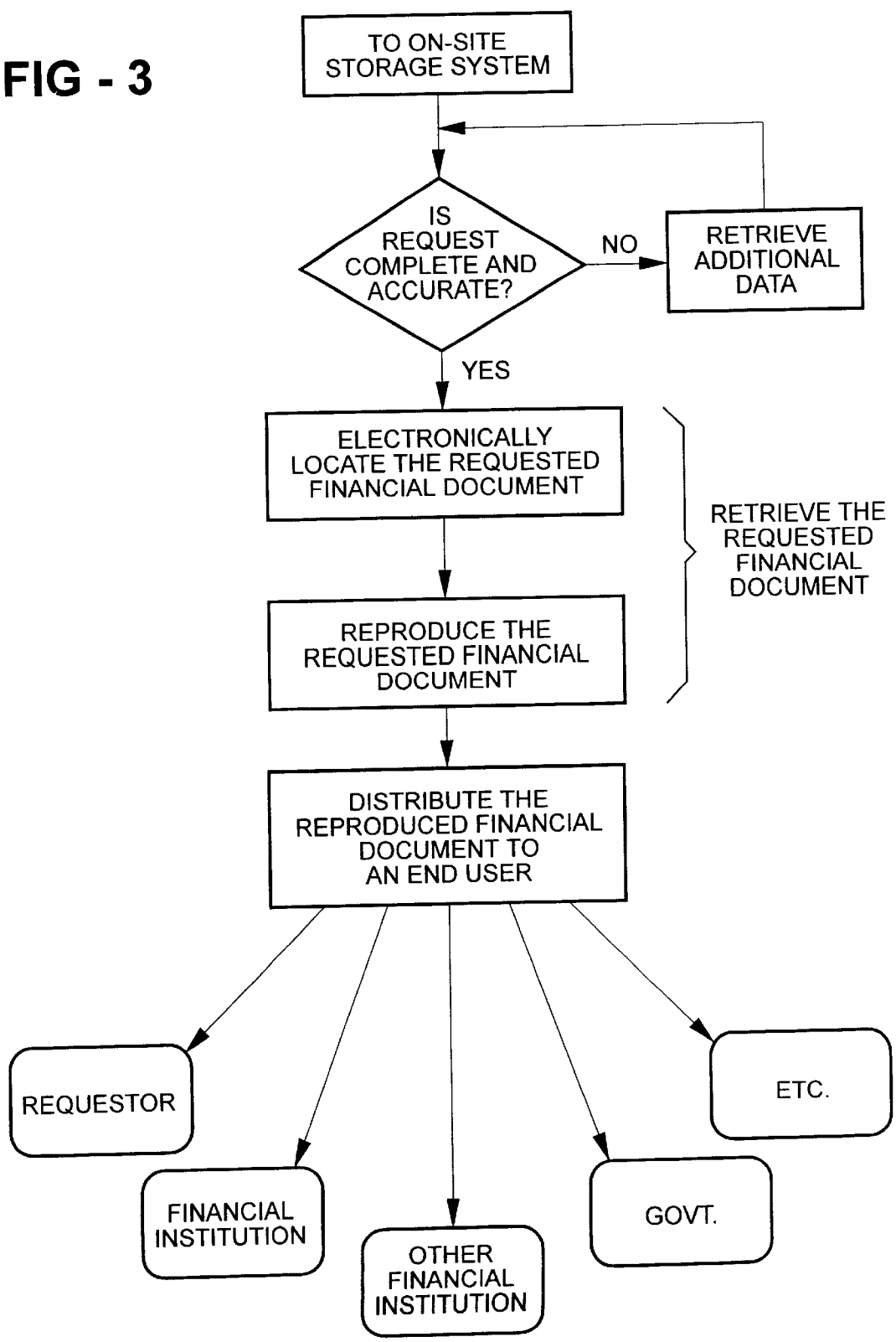

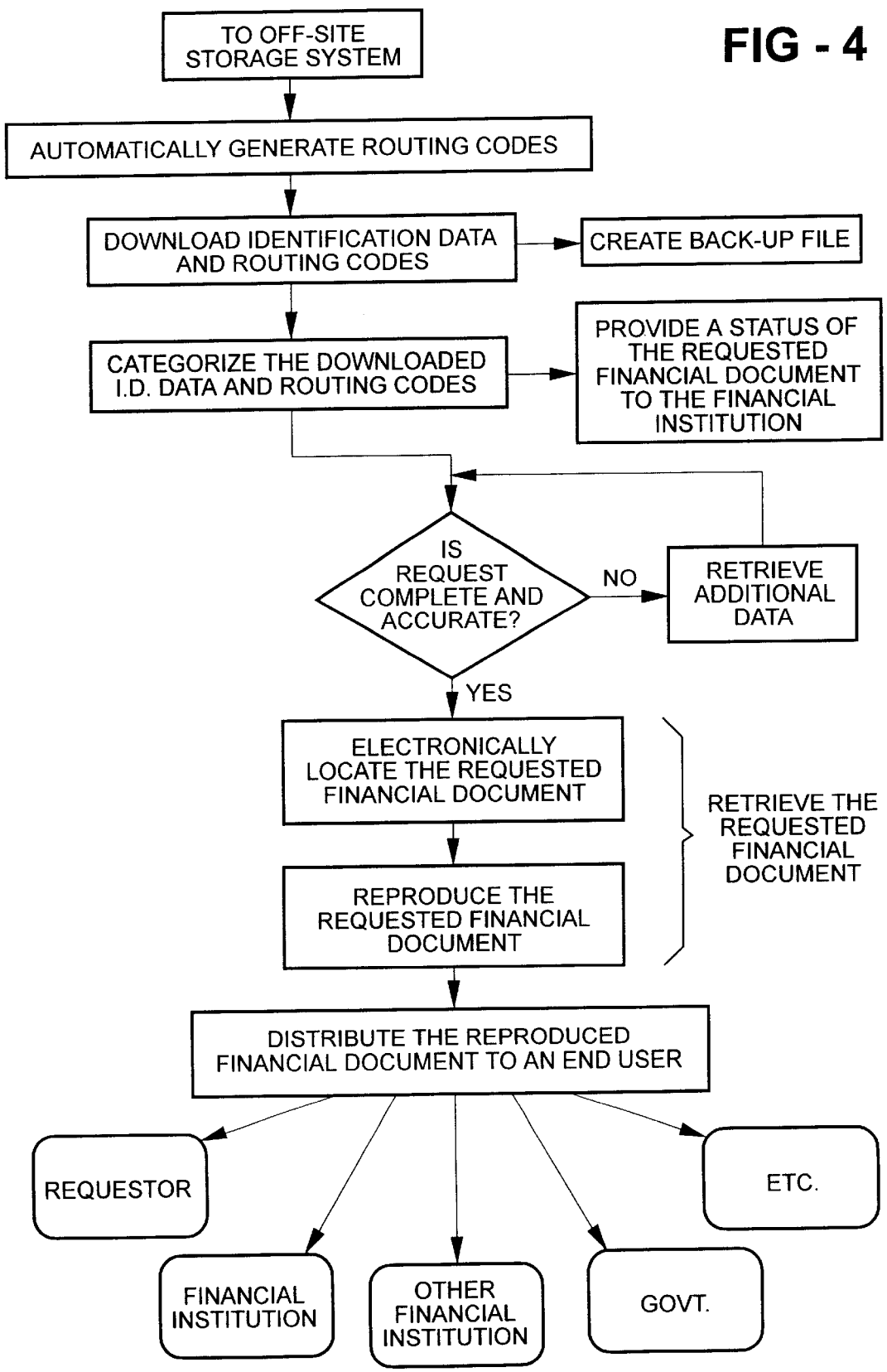

METHOD OF OBTAINING AN ELECTRONICALLY-STORED FINANCIAL DOCUMENT

RELATED APPLICATIONS

This patent application claims priority to and all advantages of U.S. Provisional Patent Application Serial No. 60/129,021 which was filed on Apr. 13, 1999 and is entitled "REMOTE DOCUMENT RETRIEVAL AND STORAGE SYSTEM."

BACKGROUND OF THE INVENTION

1) Technical Field

The subject invention relates to a method for a financial institution to obtain electronically-stored financial documents from an off-site storage system remotely-located from an on-site storage system.

2) Description of the Prior Art

Methods for obtaining electronically-stored financial documents are generally known in the art. Financial institutions, such as banks and credit unions, utilize such methods to rapidly and efficiently obtain financial documents for distribution to clients upon request. Such financial documents include paid checks, account statements, and other related documents. These financial documents are typically stored on microfiche, microfilm, digitally, or by some other electronic storage means. Further, these financial documents are typically electronically-stored in an on-site storage system located at the financial institution or in an off-site storage system. Electronic storage of these financial documents permits financial institutions to eliminate storage of paper or "hard" copies of these documents. The electronic storage of these documents also provides a means of retrieving the information from the on-site and off-site storage systems.

Once the document is stored, the client may request an image of a particular stored document. Client requests are made to replace lost or stolen documents, for tax purposes, for proof of financial transactions, for legal disputes, and other similar matters. The client's request is inputted into a computer terminal at the financial institution. More specifically, conventional methods for obtaining an electronically-stored financial document enable an employee of the financial institution, such as a bank teller, to input the request into an interface incorporated into the computer terminal. The interface is inter-linked with the on-site storage system. Typically, all requests for a particular period are grouped together and subsequently downloaded for retrieval of the requested image by the financial institution. The financial institution retrieves the image, e.g. a photocopy of the check, and then distributes the photocopy to the client via facsimile, mail or hand delivery. The storing, downloading, and retrieving of the financial document, including the reproduction and the distribution of the document, are known in the industry as back office production. Back office production for financial institutions is particularly resource intensive, time consuming, and expensive. Also, back office production becomes increasingly expensive if the client requests a particularly old financial document because older financial documents frequently require more resources and time to locate and retrieve.

The majority of financial institutions electronically store financial documents only in an on-site storage system and not in an off-site storage system. Consequently, these financial institutions are unable to outsource the responsibilities for the back office production to third party entities to alleviate the expenses and resources associated with the back office production. These financial institutions realize a significant financial burden since the back office production is concentrated strictly at the financial institution.

Other financial institutions do electronically store financial documents in on-site and off-site storage systems. However, the methods utilized by these financial institutions to access the financial documents stored in the off-site storage system are deficient in that the interface utilized in such methods is only inter-linked with the on-site storage system. That is, there is no interface independently inter-linked with the off-site storage system. As a result, the financial documents stored in the off-site storage system can not be efficiently accessed. These financial institutions are still responsible for retrieving the requested financial documents through their back office production and their expenses remain high. One such method of retrieving documents from on-site and off-sited storage systems is disclosed in U.S. Pat. No. 5,784,610 to Copeland, III et al.

Due to the inefficiencies identified in the conventional methods used by financial institutions to obtain financial documents, it is desirable to implement a method for a financial institution to obtain electronically-stored financial documents from both on-site and off-site storage systems that reduces, if not eliminates, the back office production of the financial institution by providing a direct interface inter-linked with the off-site storage system. With such an interface, the responsibility for retrieving financial documents from the off-site storage can be outsourced to third party entities while still providing the financial institution with efficient access to any financial documents electronically-stored in the off-site storage system.

SUMMARY OF THE INVENTION AND ADVANTAGES

A method for a financial institution to obtain electronically-stored financial documents having a specific document parameter is disclosed. The specific document parameter is typically a particular numerical sequence, such as a record date of the financial document. The method of the subject invention enables the financial institution to obtain the financial documents from an off-site storage system. The off-site storage system is remotely-located from an on-site storage system. The financial documents of the financial institution are maintained in the off-site storage system when the specific document parameter of the financial document is greater than a predetermined parameter. The financial documents that are less than or equal to the predetermined parameter are maintained in the on-site storage system.

When the financial institution receives a request for a financial document, the financial institution compares the specific document parameter of the requested financial document to the predetermined parameter to determine if the specific document parameter is greater than, less than, or equal to the predetermined parameter. A computer terminal located at the financial institution is connected to both the off-site and on-site storage systems. The computer terminal is utilized to access one of the storage systems in response to the comparison of the specific document parameter to the predetermined parameter. For instance, if it is determined that the specific document parameter is less than or equal to the predetermined document parameter, then the computer terminal accesses the on-site storage system. On the other hand, if it is determined that the specific document param-eter of the financial document is greater than the predetermined parameter, then the computer terminal accesses the off-site storage system.

After the computer terminal accesses the appropriate storage system, identification data of the requested financial document is inputted into the computer. More specifically, to access the on-site storage system, the identification data is input into a primary interface that is specifically inter-linked with the on-site storage system. To access the off-site storage system, an exit function is selected at the primary interface and the identification data is then input into a secondary interface that is initiated upon selection of the exit function. The secondary interface is specifically inter-linked with the off-site storage system.

Finally, after the identification data of the requested financial document is inputted, the requested document is then retrieved in order to reproduce the financial document, and distribute the financial document to an end user of the financial institution.

The subject invention therefore provides a method that enables financial institutions to obtain electronically-stored financial documents from an off-site storage system via a secondary interface that is specifically inter-linked with the off-site storage system and the financial documents electronically-stored in that system. As such, the financial institution can selectively store financial documents in either an on-site storage system or the off-site storage system, and the responsibility for the financial documents in the off-site storage system can be outsourced to a third party entity. Therefore, the back office production of the financial institution associated with the retrieval and distribution of financial documents stored in the off-site storage system is strategically reduced or even completely eliminated.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a flow diagram schematically detailing an on-site storage system, and an off-site storage system in accordance with the subject invention;

FIG. 2 is a block diagram generally representing a method for a financial institution to obtain electronically-stored financial documents from the on-site and off-site storage systems;

FIG. 3 is a block diagram completing the method of obtaining electronically-stored financial documents from the on-site storage system; and FIG. 4 is a block diagram completing the method of obtaining electronically-stored financial documents from the off-site storage system.

DETAILED DESCRIPTION OF THE PREFERRED EMBODIMENT

Referring to the Figures, wherein like numerals indicate like or corresponding parts throughout the several views, a method for a financial institution to obtain an electronically-stored financial document is schematically shown at 10 in FIG. 1. The method introduced in the subject invention enables the financial institution to obtain the financial document from an off-site storage system remotely located from an on-site storage system. Preferably, the on-site storage system is located at the financial institution and the off-site storage system is located at a remote location distant from the financial institution. This allows the financial institution to 'outsource' the responsibilities associated with obtaining the financial document.

Methods for financial institutions to obtain electronically-stored documents are frequently used by such entities as banks, credit unions, and other financially-oriented institutions. For illustrative purposes only, the description of the subject invention is discussed with reference to banks. However, as appreciated by those skilled in the art, other businesses, such as insurance companies, may also utilize similar methods and incorporate the aspects of the subject invention.

Methods for banks to obtain electronically-stored financial documents are generally used by banks to rapidly and efficiently obtain financial documents for distribution to clients upon request. As described above, the financial documents for banks are usually paid checks, checking statements, and other related financial documents, and these documents include at least one specific document parameter. As appreciated by those skilled in the art, it is not the financial document (e.g. the paid check) itself that is electronically-stored. Rather, it is data included on the document such as a sequence number that is electronically stored to make up the financial document. The specific document parameter is preferably a particular numerical sequence. As appreciated, the specific document parameter of the financial document can include, but is not limited to, a record date or age of the document, a series number, or some other document identifying number of the financial document. More specifically, in the preferred embodiment of the subject invention, the particular numerical sequence of the financial document is the record date of the financial document. That is, the date that the particular financial document was created or posted.

The financial documents are typically stored on microfiche, microfilm, digitally, or by some other electronic storage means. As appreciated, the electronic storage of the financial documents is frequently created by taking an electronic photo image of the document and storing the photo image in a computer system. One such digital electronic storage device is sold by Kodak under the name of IMAGELINK™ Digital Workstation (IDW). Electronic storage of these financial documents permits banks to eliminate storage of paper or "hard" copies of these documents. The electronic storage of these documents also provides an efficient means of retrieving the information from the on-site and off-site storage systems. This will be discussed further herein below.

As described above, the financial documents are electronically-stored in either the on-site storage system located at the bank or in the off-site storage system remotely located from the on-site storage system. More specifically, the subject invention includes the step of maintaining the financial documents in the off-site storage system when the specific document parameter of the financial document is greater than a predetermined parameter. Financial documents are maintained in the on-site storage system when the specific document parameter of the financial document is less than or equal to the predetermined parameter. As appreciated, the document parameter of the financial documents stored in the off-site storage system may be greater than or equal to the predetermined parameter with the on-site storage system having documents only less than the predetermined parameter.

Similar to the specific document parameter of the financial document, the predetermined parameter is also a numerical value. The predetermined parameter is specifically a numerical value predetermined by the bank. For instance, if the specific document parameter is a series number of a paid check and the series number is greater than the predetermined parameter which, in this case, would be an arbitrarily selected base series number, then the paid check would be stored in the off-site storage system.

In the preferred embodiment of the subject invention, the predetermined numerical value is a date pre-selected by the bank. For instance, the bank may pre-select a date that is one year before a current date—the current date being the actual date that the client requests the financial document. Of course, the bank may pre-select a date that is some other time period before a current date (e.g. two or three years) without varying from the scope of the subject invention. As such, if the record date of the particular financial document is older than one year, then the particular financial document is maintained in the off-site storage system. If the record date of the particular financial document is earlier than or equal to one year, then the particular financial document is maintained in the on-site storage system. As discussed above, the document having record dates equal to the one year may be stored in the off-site or on-site storage systems.

Once the financial document is maintained in the appropriate storage system, the bank is capable of receiving a request for the financial document from the client. In reality, the client is requesting an image of the stored financial document. As appreciated, clients request the image for various reasons. As discussed above, requests are typically made for replacing lost or stolen financial documents, for tax purposes, for proof of financial transactions, for legal disputes, and other similar matters. Ultimately, the bank retrieves the image, reproduces the image, and distributes the reproduced image to the requesting client of the bank.

Referring now to FIG. 1, the method for banks to obtain electronically-stored financial documents is discussed in detail. Initially, the requesting client requests a particular financial document, such as a paid check. The client is typically a customer of the bank or other financial institution. The client's request is inputted into a computer terminal 11 at the financial institution. The computer terminal 11 will be discussed in more detail hereinbelow.

From the computer terminal 11, the request is fed into a mainframe computer 12 at the bank. In the preferred embodiment of the subject invention, if the client requests a financial document having a record date earlier than or equal to one year before the current date, then the request, and other requests like it, are processed at the bank in the on-site storage system. That is, the requests are grouped together and downloaded to a downloading terminal 14 at the bank. The downloading may occur at particular intervals such as at the end of each day, every three hours, etc. The sequence number of each check requested is then determined. A document terminal 16 subsequently creates or reproduces the document, i.e., a photocopy of the check. The photocopy is then distributed to the client via facsimile, mail, or hand delivery.

It is known in the art that the majority of requests for financial documents are requests for documents which were created in the most recent year. That is, if the pre-selected date is one year before the current date, as in the preferred embodiment, then the majority of requests are seeking financial documents having a record date earlier than or equal to the pre-selected date. The remaining document requests relate to financial documents that are older than one year. Since, as described in the Background of the Invention, retrieval of financial documents that are older than one year is particularly expensive, the preferred embodiment of the subject invention outsources all of the document requests which relate to documents having a record date later than one year before the current date. As appreciated, the particular time frame which is outsourced is not a critical feature of the subject invention and may be adjusted to meet the needs of any particular financial institution. In fact, all of the document requests, including the most recent, may be outsourced using the outsourcing procedure of the subject invention.

In the preferred embodiment, if the client requests a financial document having a record date later than one year before the current date, then the request, and others like it, are grouped together and downloaded from the mainframe computer 12 to an outsourced downloading terminal 18. As above, the downloading may be at particular intervals as needed. The sequence number is determined by a sequencing terminal 20. The sequence number is then sent back to the outsourced downloading terminal 18. An outsourced document terminal 22 then creates or reproduces the desired document which is then distributed to either the client or the bank. As appreciated, two document retrieval operations, one for the bank to retrieve financial documents having record dates earlier than or equal to one year before the current date, and another to retrieve outsourced financial documents having record dates later than one year before the current date, preferably operate simultaneously. It is to be understood that the computer terminals and the accompanying PC bases are illustrated highly schematically in FIG. 1 and are not intended to be limiting in any manner. For instance, the schematic illustration of the outsourced document terminal 22 need not include a computer terminal and an accompanying PC base. Instead, the outsourced document terminal 22 is preferably some sort of printing device.

Referring to FIGS. 2 through 4, the method for banks to obtain electronically-stored financial documents is described in even greater detail. The request is first generated by the client. The request is then processed by the bank. The processing, retrieval and reproduction of the requested financial document is typically controlled by one interlinked computer software program. One such computer software program is a software program called Antinori Software Incorporated or ASI which is sold under the name of INNOVASION™ by Carreker-Antinori of Dallas, Tx. However, other frequently used software programs include PEGAT™ and Sterling™. Any of these computer software systems can provide the necessary means for implementing the discussed procedures.

The processing of the request is completed by a customer service tracking system and the computer terminal 11. The customer service tracking system assists the financial institution in receiving the request. More specifically, the customer service tracking system gives branches, customer service, and other bank departments the capability to enter, log, track, route and monitor the status of all requests for financial documents. The customer service tracking system also provides the capability to enter, log, track, route and monitor the status of customer complaints and other customer service related items.

A bank employee, such as a bank teller first determines a status of the requested document. More specifically, the employee compares the specific document parameter of the requested financial document to the predetermined parameter to determine if the specific document parameter is greater than, less than, or equal to the predetermined parameter. If the specific document parameter is a particular numerical sequence and the predetermined parameter is a predetermined numerical value, then the employee compares the particular numerical sequence of the financial document to the predetermined numerical value to determine if the particular numerical sequence is greater than, less than, or equal to the predetermined numerical value. Further, if as in the preferred embodiment, the particular numerical sequence is a record date of the financial document, and the predetermined numerical value is a pre-selected date, then the employee compares the record date of the financial document to the pre-selected date to determined if the record date is later than, earlier than, or equal to the pre-selected date.

The customer service tracking system enables a bank employee, such as a bank teller, to submit the request. More specifically, the employee utilizes the computer terminal 11 located at the bank and connected to both the off-site and on-site storage systems to access one of the storage systems in response to the comparison of the specific document parameter of the requested financial document to the predetermined parameter. For instance, when the particular numerical sequence of the financial document is greater than the predetermined numerical value, the employee preferably utilizes the computer terminal 11 to access the off-site storage system, and when the particular numerical sequence of the financial document is less than or equal to the predetermined numerical value, the employee preferably utilizes the computer terminal 11 to access the on-site storage system. As discussed above, the documents have a numerical sequence equal to the predetermined numerical value may be stored in either the off-site or on-site storage systems.

After the computer terminal 11 is utilized to access the desired storage system, the employee manually inputs identification data of the requested financial document into the computer terminal 11. More specifically, when the particular numerical sequence of the financial document is less than or equal to the predetermined numerical value, the employee inputs identification data into a primary interface and selects the requested document. Also, the primary interface preferably provides an option for the employee to select among several different output formats. The primary interface is inter-linked with the on-site storage system. In the preferred embodiment of the subject invention, the primary interface appears as follows and includes the identification data detailed below:

| | |
|---|---|
| Account Number: | Prod Type: |
| Account Name: | Customer Code: |
| Address: | |
| City: State: | Zip Code: |
| Home Phone: ( ) | Work Phone: ( ) |
| Fax: ( ) | |
| Service Code: | |
| For Items Posted Within A Year | |
| Copy of Statement Only | Savings Items |
| Copy of Check/Deposit Ticket | Misc (G/L, Loans, Teller, Etc) |
| Check(s)/Deposit(s)<30 Items | Cash Letter Reconstruction |
| Statements and<30 Items | Lockbox |
| Statements and>30 Items | Legal Statement Only |
| Deposit Reconstruction | Legal Statement and Items |
| Regardless of Posting Date | |
| Missing Transactions | Returned Items |
| Online (Backdated/Unposted) | Encoding Error/Wrong Account |

EXIT FUNCTION

Alternatively, when the particular numerical sequence of the financial document is greater than the predetermined numerical value, the employee selects an exit function at the primary interface. The exit function distinguishes that the request is to be sent to an outsourcing third party entity. Upon selection of the exit function at the primary interface, a secondary interface, inter-linked with the exit function, is initiated. The secondary interface is inter-linked with the off-site storage system. The employee inputs identification data into the secondary interface and selects the requested document. Also, the secondary interface preferably provides an option for the employee to select among several different output formats. Preferably, routing, or service codes will be generated automatically upon the initiation of the secondary interface and the inputting of the identification data into the secondary interface. The routing codes enable the bank to recognize that the request is being sent to the outsourced third party entity. Furthermore, the routing codes are configured to automatically forward the inputted identification data to the off-site storage system. The inputted identification data and the routing codes are forwarded into the mainframe computer 12 introduced above for temporary storage before transfer to the off-site storage system. This temporary storage also serves to defend against unexpected power outages, computer malfunctions, and the like. In the preferred embodiment of the subject invention, the secondary interface appears as follows and includes the identification data detailed below:

| | |
|---|---|
| Account Number: | Prod Type: |
| Account Name: | Customer Code: |
| Address: | |
| City: State: | Zip Code: |
| Home Phone: ( ) | Work Phone: ( ) |
| Fax: ( ) | |
| Service Code: | |
| For Items Posted Prior to a Year | |
| Copy of Statement Only | Savings Items |
| Copy of Check/Deposit Ticket | Misc (G/L, Loans, Teller, Etc) |
| Check(s)/Deposit(s)<30 Items | Cash Letter Reconstruction |
| Statements and<30 Items | Lockbox |
| Statements and>30 Items | Legal Statement Only |
| Deposit Reconstruction | Legal Statement and Items |

Once the bank employee has inputted the necessary identification data into either the primary or secondary interface, then retrieval of the financial document can continue. Specifically, the requested financial document is retrieved as defined by the inputted identification data. Two separate document retrieval procedures are discussed hereinbelow. One document retrieval procedure is for the financial documents having a record date earlier than or equal to the pre-selected date—one year before the current date in this example. The other document retrieval procedure is for the financial documents having a record date later than the pre-selected date. As discussed above, the one year timing selected for the pre-selected date is simply shown as an example and any suitable time frame may be utilized. In fact, even all financial document retrievals may be outsourced to the third party entity. As also discussed above, the two separate document retrieval procedures will typically operate simultaneously.

With reference to the subject example, if the record date of the financial document is earlier than or equal to one year before the current date, the remaining steps occur at the bank. As discussed above, these steps are known as the back office production of the bank. The request is first categorized by a research automation system. The research automation system automates the entire workflow of a bank's research and photocopy departments by sending requests to the appropriate sequence for processing. The downloading terminal 14 serves to perform the research automation system's tasks.

Photocopy requests are routed to an image control system, statement requests are sent to a document retrieval system, and requests for financial adjustments are routed to an adjustment system. The document terminal 16 serves to perform these tasks. In the illustrated embodiment of the subject invention, the sample document request is for a paid check. Hence, the categorized sequence will be the image control system which handles photocopy requests.

Referring now to FIG. 3, after the request is categorized, the request is verified for completeness and accuracy. If the request is not complete then additional data is retrieved. The additional data is retrieved by using a sequence number retrieval system and/or an all items research system. Once the request is complete and accurate, then the image reference number can be determined. That is, once the request is complete and accurate, then the requested financial document can be electronically located in the on-site storage system. The reference number may be a routing, sequence, or any other type of indicator. The reference number is determined by the image control system. The image control system is an image retrieval and routing management system which works in conjunction with Kodak's IMAGELINK™ Digital Workstations (IDW). Specifically, the image control system first connects to a network node. The network node is any type of storage device as is known in the art, Preferably a Kodak network node is used. The network node drives the IDW to find the location of the image by using the reference number. Specifically, the employee is prompted to verify that the correct media is loaded in the IDW such that the IDW can locate the image. The reference number for the document is known and the document image is now verified and located.

The requested image can now be retrieved and reproduced. In other words a copy of the digitized document (the check) is created. The copy may be created by manually pulling the microfilm, microfiche, or the like and photocopying the document. The copy may also be made by printing the document from a digitized record. The photocopy of the check is then distributed to the requesting client or other end user of the financial institution. Other end users of the financial institution include, but are not limited to, other financial institutions and federal and state governments. Additional information such as a photocopy report, a statement of charges, a research report and/or a daily status report may also be produced for the requesting client, the other end user, and/or the financial institution. The document retrieval system incorporated at the bank and the method for obtaining electronically-stored financial documents from the on-site storage system is now completed.

Continuing with the subject example, if the record date of the financial document is later than one year before the current date, the automated retrieval of the financial document is outsourced to the third party entity. To begin, a separate file is automatically generated at the bank by the input of the identification data into the secondary interface. Referring specifically to FIG. 4, the routing codes direct the request created on the separate file to be routed separately to the outsourced third party entity. In the preferred embodiment of the subject invention, additional user ID's are created to allow only selected users into the secondary interface. The identification data stored in the separate file and the routing codes are downloaded to the off-site storage system for retrieval of the requested financial documents by the outsourced downloading terminal 18. Preferably, the identification data and routing codes are grouped into batches of common requests for optimum retrieval of the requested financial document by the outsourced third party entity at the off-site storage system. The downloading step may occur at any suitable predetermined interval. Preferably, the downloading will occur three times a day. The downloaded documents are known in the industry as a basket of requests.

The subject method further includes the step of creating a back-up file of the downloaded identification data and routing codes in the off-site storage system. The back-up file acts as an emergency information source in case the mainframe computer 12 at the financial institution has a catastrophic failure. In addition, the outsourced third party entity is in direct connection with the mainframe computer 12 of the bank wherein the outsourced third party entity may produce a backup directory of each database file. This database backup is an additional safe guard for the financial institution.

The downloaded identification data and routing codes are then categorized for processing in the off-site storage system. The research automation system categorizes this information in a like fashion as discussed above. In fact, the outsourced third party entity uses the same computer software package as the financial institution such that the flow of information is optimum and not interrupted. As discussed above, the subject example request is for a paid check. Hence, the request will be categorized into the image control system and a sequence number will be determined by the sequencing terminal 20. Also, a status to update the progress of the requested financial document is provided to the financial institution.

After the request is categorized, the request, specifically the inputted identification data, is verified for completeness and accuracy. If the request is not complete or accurate, then additional data is retrieved. In a similar fashion as above, the additional data is retrieved by using the sequence number retrieval system and/or the all items research system. As appreciated, the outsourced third party entity may retrieve this information from the mainframe computer 12, via its direct line, or from its own backup database files. Once the request is complete and accurate, the image reference number can be determined. Again, as above, the reference number is determined by the image control system.

The requested image is then retrieved. More specifically, the requested financial document is electronically located in the off-site storage system. Additionally, the requested financial document is also reproduced after the document is electronically located in the off-site storage system by the outsourced document terminal 22. In other words, a copy of the digitized document (the check) is created. A status file is then created for the completed transaction. Also, a status of the request is sent to the financial institution wherein the institution may update their records. The status updates, as well as the information connections, create a two way information exchange between the outsourced third party entity and the bank.

The photocopy of the check is then distributed or digitally transferred to the requesting client, the financial institution, or other end users of the financial institution. In the preferred embodiment of the subject invention, the photocopy of the request is distributed to the requesting client, etc. based on the routing codes. That is, in addition to directing the request to be separately routed to the outsourced third party entity, the routing codes also indicate an appropriate distribution for the request client or other end user. The request is now completed.

A special circumstance occurs when the record date of one portion of the client's request is earlier than or equal to one year before the current date, and when the record date of another portion of the client's request is later than one year before the current date. These types of requests are known in the industry as spanned requests. One solution is to incorporate an additional interface utilized when the employee of the bank is utilizing the computer terminal 11 and comparing the specific document parameter of the requested financial document to the predetermined parameter to determine if the specific document parameter is greater than, less than, or equal to the predetermined parameter. If the request is a spanned request, then the request will be split into two separate requests which can be handled simultaneously. A special notation would be put onto the requests such that they may be put back together before distributing the documents to the client or other end user. Another solution simply notifies the inputting employee that two requests should be entered separately. A third solution sends the request to the back office production at the bank wherein the back office employees notify the outsourced third party entity by a separate request to retrieve the requested financial documents.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for a financial institution to obtain a stored financial document from an off-site storage system remotely-located from an on-site storage system wherein the financial document includes at least one specific document parameter with the specific document parameter being a specific document age, said method comprising the steps of:

maintaining the financial document in the off-site storage system when the specific document age of the financial document is greater than a predetermined age;

maintaining the financial document in the on-site storage system when the specific document age of the financial document is less than or equal to the predetermined age;

receiving a request for the financial document at the financial institution;

comparing the specific document age of the requested financial document to the predetermined age to determine if the specific document age is greater than, less than, or equal to the predetermined age;

utilizing a computer terminal located at the financial institution and connected to the off-site and on-site storage systems;

automatically accessing one of the storage systems in response to the comparison of the specific document age of the requested financial document to the predetermined age;

inputting identification data of the requested financial document into the computer terminal after the desired storage system is accessed by utilizing a primary interface inter-linked with the on-site storage system when the specific document age of the financial document is less than or equal to the predetermined age and selecting an exit function at the primary interface when the specific document age of the financial document is greater than the predetermined age; and retrieving the requested financial document as defined by the inputted identification data.

2. A method as set forth in claim 1 wherein the specific document parameter of the financial document is a particular numerical sequence associated with the specific document age and the predetermined age is a predetermined numerical value.

3. A method as set forth in claim 2 wherein the step of comparing the specific document age to the predetermined age is further defined by comparing the particular numerical sequence of the financial document to the predetermined numerical value to determine if the particular numerical sequence is greater than, less than, or equal to the predetermined numerical value.

4. A method as set forth in claim 2 wherein the particular numerical sequence of the financial document is a record date of the financial document and the predetermined numerical value is a pre-selected date.

5. A method as set forth in claim 4 wherein the step of comparing the specific document age to the predetermined age is further defined by comparing the record date of the financial document to the pre-selected date to determined if the record date is later than, earlier than, or equal to the pre-selected date.

6. A method as set forth in claim 2 wherein the step of utilizing the computer terminal to access one of the storage systems is further defined by accessing the off-site storage system when the particular numerical sequence is greater than the predetermined numerical value and accessing the on-site storage system when the particular numerical sequence is less than or equal to the predetermined numerical value.

7. A method as set forth in claim 6 wherein the step of inputting identification data of the requested financial document into the computer terminal is further defined by inputting identification data into the primary interface inter-linked with the on-site storage system when the particular numerical sequence of the financial document is less than or equal to the predetermined numerical value.

8. A method as set forth in claim 7 wherein the step of inputting identification data of the requested financial document into the computer terminal is further defined by selecting the exit function at the primary interface when the particular numerical sequence of the financial document is greater than the predetermined numerical value.

9. A method as set forth in claim 8 wherein the selection of the exit function is further defined by initiating a secondary interface inter-linked with the off-site storage system and inputting identification data into the secondary interface.

10. A method as set forth in claim 9 wherein the step of inputting identification data into the secondary interface is further defined by selecting a desired output format for the requested financial document.

11. A method as set forth in claim 9 further including the step of automatically generating routing codes upon the initiation of the secondary interface and the inputting of the identification data into the secondary interface.

12. A method as set forth in claim 11 further including the step of inter-linking the exit function with the secondary interface and configuring the routing codes to automatically forward the inputted identification data to the off-site storage system.

13. A method as set forth in claim 12 further including the step of forwarding the inputted identification data and the routing codes into a mainframe computer for temporarily storing the identification data and routing codes in the mainframe computer.

14. A method as set forth in claim 13 further including the step of downloading the stored identification data and routing codes to the off-site storage system for retrieval of the requested financial documents.

15. A method as set forth in claim 14 further including the step of grouping the stored identification data and routing codes into batches of common requests for optimum retrieval of the requested financial document.

16. A method as set forth in claim 14 further including the step of creating a back-up file of the downloaded identification data and routing codes in the off-site storage system.

17. A method as set forth in claim 14 further including the step of categorizing the downloaded identification data and routing codes for processing in the off-site storage system.

18. A method as set forth in claim 17 further including the step of providing a status of the requested financial document to update progress to the financial institution.

19. A method as set forth in claim 17 further including the step of verifying the completeness and accuracy of the inputted identification data.

20. A method as set forth in claim 19 wherein the step of retrieving the requested financial document is further defined by electronically locating the requested financial document in the off-site storage system.

21. A method as set forth in claim 20 wherein the step of retrieving the requested financial document is further defined by reproducing the requested financial document after the requested financial document is electronically located in the off-site storage system.

22. A method as set forth in claim 21 further including the step of distributing the reproduced financial document to an end user of the financial institution based on the routing codes.

23. A method for a financial institution to obtain a stored financial document from an off-site storage system remotely-located from an on-site storage system wherein the financial document includes at least one specific document parameter with the specific document parameter being a specific document age, said method comprising the steps of:

maintaining the financial document in the off-site storage system when the specific document age of the financial document is greater than a predetermine age;

maintaining the financial document in the on-site storage system when the specific document age of the financial document is less than or equal to the predetermined age;

receiving a request for the financial document at the financial institution;

comparing the specific document age of the requested financial document to the predetermined age to determine if the specific document age is greater than, less than, or equal to the predetermined age;

utilizing a computer terminal associated with the financial institution and connected to the off-site and on-site storage systems;

automatically accessing the off-site storage system through the computer terminal when the specific document age is greater than the predetermined age and automatically accessing the on-site storage system through computer terminal when the specific document age is less than or equal to the predetermined age;

inputting identification data of the requested financial document into the computer terminal while the storage systems are accessed; and automatically retrieving the requested financial document from the accessed storage system as defined by the inputted identification data.

24. A method as set forth in claim 23 further including the step of storing the financial document in a fixed medium at one of the off-site and on-site storage systems based on the specific document age of the financial document.

25. A method as set forth in claim 24 wherein the step of storing the financial document in a fixed medium is further defined as electronically storing the financial document in a fixed electronic medium.

26. A method as set forth in claim 24 wherein the step of storing the financial document in a fixed medium is further defined as storing the financial document on microfilm.

27. A method as set forth in claim 24 wherein the step of storing the financial document in a fixed medium is further defined as storing the financial document on microfiche.

28. A method as set forth in claim 23 wherein the step of retrieving the requested financial document is further defined by electronically locating the requested financial document in the off-site storage system.

29. A method as set forth in claim 28 further including the step of reproducing the requested financial document after the requested financial document is electronically located in the off-site storage system.

30. A method as set forth in claim 29 further including the step of distributing the reproduced financial document to the financial instition based on routing codes.

31. A method as set forth in claim 23 wherein the step of automatically accessing the off-site and on-site storage systems is further defined by accessing only one of the storage systems at any one time.

32. A method as set forth in claim 23 wherein the specific document parameter of the financial document is a particular numerical sequence associated with the specific document age and the predetermined age is a predetermined numerical value.

33. A method as set forth in claim 32 wherein the step of comparing the specific document age to the predetermined age is further defined by comparing the particular numerical sequence of the financial document to the predetermined numerical value to determine if the particular numerical sequence is greater than, less than, or equal to the predetermined numerical value.

34. A method as set forth in claim 33 wherein the step of automatically accessing the off-site and on-site storage systems is further defined by accessing the off-site storage system when the particular numerical sequence is greater than the predetermined numerical value and accessing the on-site storage system when the particular numerical sequence is less than or equal to the predetermined numerical value.

35. A method as set forth in claim 32 wherein the particular numerical sequence of the financial document is a record date of the financial document and the predetermined numerical value is a preselected date.

36. A method as set forth in claim 32 wherein the step of inputting identification data of the requested financial document into the computer terminal is further defined by inputting identification data into a primary interface inter-linked with the on-site storage system when the particular numerical sequence of the financial document is less than or equal to the predetermined numerical value.

37. A method as set forth in claim 36 wherein the step of inputting identification data of the requested financial document into the computer terminal is further defined by selecting an exit function at the primary interface when the particular numerical sequence of the financial document is greater than the predetermined numerical value.

38. A method as set forth in claim 37 wherein the selection of the exit function is further defined by initiating a secondary interface inter-linked with the off-site storage system and inputting identification data into the secondary interface.

39. A method as set forth in claim 38 wherein the step of inputting identification data into the secondary interface is further defined by selecting a desired output format for the requested financial document.

40. A method as set forth in claim 38 further including the step of automatically generating routing codes upon the initiation of the secondary interface and the inputting of the identification data into the secondary interface.

41. A method as set forth in claim 40 further including the step of inter-linking the exit function with the secondary interface and configuring the routing codes to automatically forward the inputted identification data to the off-site storage system.

42. A method as set forth in claim 41 further including the step of forwarding the inputted identification data and the routing codes into a mainframe computer for temporarily storing the identification data and routing codes in the mainframe computer.

43. A method as set forth in claim 42 further including the step of downloading the stored identification data and routing codes to the off-site storage system for retrieval of the requested financial documents.

44. A method as set forth in claim 43 further including the step of grouping the stored identification data and routing codes into batches of common requests for optimum retrieval of the requested financial document.

45. A method as set forth in claim 43 further including the step of creating a back-up file of the downloaded identification data and routing codes in the off-site storage system.

46. A method as set forth in claim 43 further including the step of categorizing the downloaded identification data and routing codes for processing in the off-site storage system.

47. A method as set forth in claim 46 further including the step of providing a status of the requested financial document to update progress to the financial institution.

48. A method as set forth in claim 46 further including the step of verifying the completeness and accuracy of the inputted identification data.

49. A method as set forth in claim 23 wherein the step of inputting identification data into the computer terminal is further defined as inputting identification data of the requested financial document into the computer terminal after the desired storage system is accessed.

50. A method for a financial institution to obtain a stored financial document from an off-site storage system remotely-located from an on-site storage system wherein the financial document includes at least one specific document parameter with the specific document parameter being a specific document age, said method comprising the steps of:

providing an outsourcing institution associated with the off-site storage system and a requestor;

associating the financial institution with the on-site storage system wherein the outsourcing institution, requestor, and financial institution are different from each other;

maintaining the financial document with the outsourcing institution in the off-site storage system when the specific document age of the financial document is greater than a predetermined age;

maintaining the financial document with the financial institution in the on-site storage system when the specific document age of the financial document is less than or equal to the predetermined age;

receiving a request from the requestor for the financial document at the financial institution;

comparing the specific document age of the requested financial document to the predetermined age to determine if the specific document age is greater than, less than, or equal to the predetermined age;

utilizing a computer terminal associated with the financial institution and connected to the off-site and on-site storage systems;

automatically accessing the off-site storage system when the specific document age is greater than the predetermined age and to access the on-site storage system when the specific document age is less than or equal to the predetermined age;

inputting identification data of the requested financial document into the computer terminal while the desired storage system is accessed; and retrieving the requested financial document as defined by the inputted identification data.

51. A method as set forth in claim 50 wherein the specific document parameter of the financial document is a particular numerical sequence associated with the specific document age and the predetermined age is a predetermined numerical value.

52. A method as set forth in claim 51 wherein the particular numerical sequence of the financial document is a record date of the financial document and the predetermined numerical value is a pre-selected date.

53. A method as set forth in claim 51 wherein the step of utilizing the computer terminal to access one of the storage systems is further defined by accessing the off-site storage system when the particular numerical sequence is greater than the predetermined numerical value and accessing the on-site storage system when the particular numerical sequence is less than or equal to the predetermined numerical value.

54. A method as set forth in claim 51 wherein the step of inputting identification data of the requested financial document into the computer terminal is further defined by inputting identification data into a primary interface inter-linked with the on-site storage system when the particular numerical sequence of the financial document is less than or equal to the predetermined numerical value.

55. A method as set forth in claim 54 wherein the step of inputting identification data of the requested financial document into the computer terminal is further defined by selecting an exit function at the primary interface when the particular numerical sequence of the financial document is greater than the predetermined numerical value.

56. A method as set forth in claim 55 wherein the selection of the exit function is further defined by inputting a secondary interface inter-linked with the off-site storage system and inputting identification data into the secondary interface.

57. A method as set forth in claim 50 further including the step of storing the financial document in a fixed medium at one of the off-site and on-site storage systems based on the specific document age of the financial document.

58. A method as set forth in claim 50 wherein the step of retrieving the requested financial document is further defined by electronically locating the requested financial document in the off-site storage system.

59. A method as set forth in claim 58 wherein the step of retrieving the requested financial document is further defined by reproducing the requested financial document after the requested financial document is electronically located in the off-site storage system.

60. A method as set forth in claim 59 further including the step of distributing the reproduced financial document to the financial institution based on routing codes.

61. A method as set forth in claim 50 wherein the step of utilizing a computer terminal associated with the financial institution and connected to the off-site and on-site storage systems to access the off-site and on-site storage systems is further defined by accessing only one of the storage systems at any one time.

\* \* \* \* \*

UNITED STATES PATENT AND TRADEMARK OFFICE
CERTIFICATE OF CORRECTION

PATENT NO. : 6,446,072 B1
DATED : September 3, 2002
INVENTOR(S) : Michael D. Schulze It is certified that error appears in the above-identified patent and that said Letters Patent is hereby corrected as shown below:

Column 13,
Line 56, before "computer terminal" insert -- the --.

Column 14,
Line 45, please replace "preselected date" with -- pre-selected date --.

Column 16,
Line 3, please replace "to access" with -- accessing --.
Line 41, please replace "inputting" with -- initiating --.

Column 16,
Line 65, after Claim 61 insert the following claims;

-- 62. A method for a financial institution to obtain a stored financial document from an off-site storage system remotely-located from an on-site storage system wherein the financial document includes at least one specific document parameter with the specific document parameter being a specific document age, said method comprising the steps of:

maintaining the financial document in the off-site storage system when the specific document age of the financial document is greater than or equal to a predetermined age;

maintaining the financial document in the on-site storage system when the specific document age of the financial document is less than the predetermined age;

receiving a request for the financial document at the financial institution;

comparing the specific document age of the requested financial document to the predetermined age to determine if the specific document age is greater than, less than, or equal to the predetermined age;

utilizing a computer terminal associated with the financial institution and connected to the off-site and on-site storage systems;

UNITED STATES PATENT AND TRADEMARK OFFICE
CERTIFICATE OF CORRECTION

PATENT NO.    : 6,446,072 B1
DATED         : September 3, 2002
INVENTOR(S)   : Michael D. Schulze It is certified that error appears in the above-identified patent and that said Letters Patent is hereby corrected as shown below:

automatically accessing the off-site storage system through the computer terminal when the specific document age is greater than or equal to the predetermined age and automatically accessing the on-site storage system through the computer terminal when the specific document age is less than the predetermined age;

inputting identification data of the requested financial document into the computer terminal while the storage systems are accessed; and automatically retrieving the requested financial document from the accessed storage system as defined by the inputted identification data.

63. A method as set forth in claim 62 further including the step of storing the financial document in a fixed medium at one of the off-site and on-site storage systems based on the specific document age of the financial document.

64. A method as set forth in claim 63 wherein the step of storing the financial document in a fixed medium is further defined as electronically storing the financial document in a fixed electronic medium.

65. A method as set forth in claim 63 wherein the step of storing the financial document in a fixed medium is further defined as storing the financial document on microfilm.

66. A method as set forth in claim 63 wherein the step of storing the financial document in a fixed medium is further defined as storing the financial document on microfiche.

67. A method as set forth in claim 62 wherein the step of retrieving the requested financial document is further defined by electronically locating the requested financial document in the off-site storage system.

68. A method as set forth in claim 67 further including the step of reproducing the requested financial document after the requested financial document is electronically located in the off-site storage system.

69. A method as set forth in claim 68 further including the step of distributing the reproduced financial document to the financial institution based on routing codes.

UNITED STATES PATENT AND TRADEMARK OFFICE
CERTIFICATE OF CORRECTION

PATENT NO. : 6,446,072 B1
DATED : September 3, 2002
INVENTOR(S) : Michael D. Schulze It is certified that error appears in the above-identified patent and that said Letters Patent is hereby corrected as shown below:

70. A method as set forth in claim 62 wherein the step of automatically accessing the off-site and on-site storage systems is further defined by accessing only one of the storage systems at any one time.

71. A method as set forth in claim 62 wherein the specific document parameter of the financial document is a particular numerical sequence associated with the specific document age and the predetermined age is a predetermined numerical value.

72. A method as set forth in claim 71 wherein the step of comparing the specific document age to the predetermined age is further defined by comparing the particular numerical sequence of the financial document to the predetermined numerical value to determine if the particular numerical sequence is greater than, less than, or equal to the predetermined numerical value.

73. A method as set forth in claim 72 wherein the step of automatically accessing the off-site and on-site storage systems is further defined by accessing the off-site storage system when the particular numerical sequence is greater than or equal to the predetermined numerical value and accessing the on-site storage system when the particular numerical sequence is less than the predetermined numerical value.

74. A method as set forth in claim 71 wherein the particular numerical sequence of the financial document is a record date of the financial document and the predetermined numerical value is a pre-selected date.

75. A method as set forth in claim 71 wherein the step of inputting identification data of the requested financial document into the computer terminal is further defined by inputting identification data into a primary interface inter-linked with the on-site storage system when the particular numerical sequence of the financial document is less than the predetermined numerical value.

76. A method as set forth in claim 75 wherein the step of inputting identification data of the requested financial document into the computer terminal is further defined by selecting an exit function at the primary interface when the particular numerical sequence of the financial document is greater than or equal to the predetermined numerical value.

77. A method as set forth in claim 76 wherein the selection of the exit function is further defined by initiating a secondary interface inter-linked with the off-site storage system and inputting identification data into the secondary interface.

UNITED STATES PATENT AND TRADEMARK OFFICE
CERTIFICATE OF CORRECTION

PATENT NO. : 6,446,072 B1
DATED : September 3, 2002
INVENTOR(S) : Michael D. Schulze It is certified that error appears in the above-identified patent and that said Letters Patent is hereby corrected as shown below:

78. A method as set forth in claim 77 wherein the step of inputting identification data into the secondary interface is further defined by selecting a desired output format for the requested financial document.

79. A method as set forth in claim 77 further including the step of automatically generating routing codes upon the initiation of the secondary interface and the inputting of the identification data into the secondary interface.

80. A method as set forth in claim 79 further including the step of inter-linking the exit function with the secondary interface and configuring the routing codes to automatically forward the inputted identification data to the off-site storage system.

81. A method as set forth in claim 80 further including the step of forwarding the inputted identification data and the routing codes into a mainframe computer for temporarily storing the identification data and routing codes in the mainframe computer.

82. A method as set forth in claim 81 further including the step of downloading the stored identification data and routing codes to the off-site storage system for retrieval of the requested financial documents.

83. A method as set forth in claim 82 further including the step of grouping the stored identification data and routing codes into batches of common requests for optimum retrieval of the requested financial document.

84. A method as set forth in claim 82 further including the step of creating a back-up file of the downloaded identification data and routing codes in the off-site storage system.

85. A method as set forth in claim 82 further including the step of categorizing the downloaded identification data and routing codes for processing in the off-site storage system.

UNITED STATES PATENT AND TRADEMARK OFFICE
CERTIFICATE OF CORRECTION

PATENT NO.    : 6,446,072 B1
DATED         : September 3, 2002
INVENTOR(S)   : Michael D. Schulze It is certified that error appears in the above-identified patent and that said Letters Patent is hereby corrected as shown below:

86. A method as set forth in claim 85 further including the step of providing a status of the requested financial document to update progress to the financial institution.

87. A method as set forth in claim 85 further including the step of verifying the completeness and accuracy of the inputted identification data.

88. A method as set forth in claim 62 wherein the step of inputting identification data into the computer terminal is further defined as inputting identification data of the requested financial document into the computer terminal after the desired storage system is accessed. --

Signed and Sealed this

Eighteenth Day of February, 2003

JAMES E. ROGAN
*Director of the United States Patent and Trademark Office*